(12) United States Patent
Wang

(10) Patent No.: US 7,933,044 B2
(45) Date of Patent: Apr. 26, 2011

(54) MOIRÉ-FREE COLOR HALFTONE CONFIGURATION

(75) Inventor: Shen-Ge Wang, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 217 days.

(21) Appl. No.: 12/333,883

(22) Filed: Dec. 12, 2008

(65) Prior Publication Data

US 2009/0091795 A1    Apr. 9, 2009

Related U.S. Application Data

(63) Continuation of application No. 11/296,933, filed on Dec. 8, 2005, now Pat. No. 7,480,076.

(60) Provisional application No. 60/648,236, filed on Jan. 28, 2005.

(51) Int. Cl.
G06F 15/00 (2006.01)
G06K 1/00 (2006.01)
H04N 1/60 (2006.01)

(52) U.S. Cl. ........................ 358/1.9; 358/3.09

(58) Field of Classification Search .................. 358/1.9, 358/1.1, 3.02–3.12
See application file for complete search history.

(56) References Cited

U.S. PATENT DOCUMENTS

| | | | |
|---|---|---|---|
| 5,155,599 A | 10/1992 | Delabastita | |
| 5,323,245 A | 6/1994 | Rylander | |
| 5,371,612 A | 12/1994 | Sakamoto | |
| 5,583,660 A | 12/1996 | Rylander | |
| 5,808,755 A | 9/1998 | Delabastita | |
| 6,798,539 B1 | 9/2004 | Wang et al. | |
| 6,985,256 B2 | 1/2006 | Cheng et al. | |
| 6,985,262 B2 | 1/2006 | Wang | |
| 2003/0035145 A1 | 2/2003 | Wang | |

FOREIGN PATENT DOCUMENTS

| EP | 0 748 109 A2 | 12/1996 |
|---|---|---|
| EP | 1 202 558 A2 | 5/2002 |

OTHER PUBLICATIONS

T. M. Holladay, "*An Optimum Algorithm for Halftone Generation for Displays and Hard Copies*", Proc. Soc. for Information Display, 21, p. 185 (1980).
J. A. C. Yule, "*Principles of Color Reproduction*", John Wiley & Sons, New York, 1967.
Shen-ge Wang et al., "*Nonorthogonal Halftone Screens*", Xerox Corporation, Webster, New York, NIP 2002.
Shen-ge Wang et al., U.S. Appl. No. 11/108,497, filed Apr. 18, 2005, "Angle Avoidance for Color Halftone Screens".

*Primary Examiner* — Douglas Q Tran
(74) *Attorney, Agent, or Firm* — Philip E. Blair; Fleit Gibbons Gutman Bongini & Bianco P.L.

(57) ABSTRACT

Disclosed herein is a Moiré-free color halftone configuration for clustered dots. Unlike conventional methods, the disclosed method produces periodic hexagon rosettes of identical shapes. These exemplary hexagon rosettes have three fundamental spatial frequencies exactly equal to half of the fundamental frequency of the three halftone screens. The resultant halftone outputs are truly Moiré free, as all the fundamentals and harmonic frequencies are multiples of and thus higher in frequency than the rosette fundamental frequency. The halftone outputs resulting from the employment of the exemplary rosette design methodology provided herein, are also robust to the typical misregistration among color separations commonly found in color systems.

27 Claims, 11 Drawing Sheets
(9 of 11 Drawing Sheet(s) Filed in Color)

MOIRÉ-FREE COLOR HALFTONE CONFIGURATION

CROSS REFERENCE TO RELATED APPLICATIONS

This application is a continuation of U.S. application Ser. No. 11/296,933, filed Dec. 8, 2005 by the same inventor, and claims priority from that application which in turn claims the benefit of Provisional Patent Application No. 60/648,236 filed Jan. 28, 2005 to which the present application also claims priority therefrom.

BACKGROUND AND SUMMARY

This invention is directed to a process for moiré-free halftoning color documents using combinations of non-orthogonal cluster screens.

With the advent of inexpensive digital color printers, methods and systems of color digital halftoning have become increasingly important. It is well understood that most digital color printers operate in a binary mode, i.e., for each color separation, a corresponding color spot is either printed or not printed at a specified location or pixel. Digital halftoning controls the printing of color spots, where spatially averaging the printed color spots of all the color separations provides the illusion of the required continuous color tones.

The most common halftone technique is screening, which compares the required continuous color tone level of each pixel for each color separation with one of several predetermined threshold levels. The predetermined threshold levels are stored in a halftone screen. If the required color tone level is darker than the threshold halftone level, a color spot is printed at the specified pixel. Otherwise the color spot is not printed. It is understood in the art that the distribution of printed pixels depends on the design of the halftone screen. For cluster halftone screens, all printed pixels are grouped into one or more clusters. If a cluster-halftone screen only generates a single cluster, it is referred to as a single-cell halftone screen or a single-cell halftone dot. Alternatively, halftone screens may be dual-dot, tri-dot, quad-dot, or the like.

Halftone screens are typically two-dimensional threshold arrays and are relatively small in comparison to the overall image or document to be printed. Therefore, the screening process uses an identical halftone screen repeated for each color separation in a manner similar to tiling. The output of the screening process, using a single-cell halftone dot, includes a binary pattern of multiple small "dots", which are regularly spaced and is determined by the size and the shape of the halftone screen. In other words, the screening output, as a two-dimensionally repeated pattern, possesses two fundamental spatial frequencies, which are completely defined by the geometry of the halftone screen.

While halftoning is often described in terms of the halftone dots, it should be appreciated that halftone dots can also posses shapes ranging from rectangles, squares, lines, and the like. Various digital halftone screens having different shapes and angles are described in "*An Optimum Algorithm for Halftone Generation for Displays and Hard Copies*", by T. M. Holladay, Proc. Soc. for Information Display, 21, p. 185 (1980).

A common problem that arises in digital color halftoning is the manifestation of moiré patterns. Moiré patterns are undesirable interference patterns that occur when two or more color halftone separations are printed over each other. Since color mixing during the printing process is a non-linear process, frequency components other than the fundamental frequencies of the two or more color halftone separations can occur in the final printout. For example, if an identical halftone screen is used for two color separations, theoretically, there should be no moiré patterns. However, any slight misalignment between the two color halftone separations occurring from an angular difference and/or a scalar difference will result in two slightly different fundamental frequencies, which will be visibly evident as a very pronounced moiré interference pattern in the output. To avoid, for example, two-color moiré patterns due to misalignment, or for other reasons, different halftone screens are commonly used for different color separations, where the fundamental frequencies of the different halftone screens are separated by relatively large angles. Therefore, the frequency difference between any two fundamental frequencies of the different screens will be large enough so that no visibly noticeable moiré patterns are produced.

In selecting different halftone screens, for example, for three color separations, it is desirable to avoid any two-color moiré as well as any three-color moiré. It is well known that in the traditional printing industry that three halftone screens, which are square in shape and identical, can be placed at 15, 45, and 75, degrees, respectively, from a point of origin, to provide the classical three-color moiré-free solution. This is described in "*Principles of Color Reproduction*", by J. A. G. Yule, John Wiley & Sons. N.Y. 1967.

However, for digital halftoning, the freedom to rotate a halftone screen is limited by the raster structure, which defines the position of each pixel. Since $\tan(15°)$ and $\tan(75°)$ are irrational numbers, rotating a halftone screen to 15° or 75° cannot be exactly implemented in digital halftoning. To this end, some methods have been proposed to provide approximate instead of exact moiré-free solutions. For example, in U.S. Pat. Nos. 5,323,245 and 5,583,660, this problem is approached by using a combination of two or more perpendicular, unequal frequency screen patterns and non-perpendicular, equal frequency non-conventional screen patterns. However, all these approximate solutions result in some halftone dots having centers that do not lie directly on addressable points, or on the pixel positions defined by the raster structure. Therefore, the shape and center location varies from one halftone dot to another. Consequently, additional interference or moiré between the screen frequencies and the raster frequency can occur. In another approach, U.S. Pat. No. 5,371,612 discloses a moiré prevention method to determine screen angles and sizes that is usable solely for square-shaped, halftone screens.

U.S. Pat. No. 6,798,539 to Wang et al., discloses methods for using single-cell, non-orthogonal cluster screens to satisfy the moiré-free conditions for color halftoning. The disclosure also provides methods that combine single-cell non-orthogonal cluster screens and line screens for moiré-free color halftoning. Particularly, the selection of these single-cell halftone screens is determined by satisfying moiré-free conditions provided in the respective spatial or frequency equations. U.S. Pat. No. 6,798,539 to Wang et al. provides a background basis for the disclosure as taught in the specification which follows below, and as such is hereby incorporated in its entirety for its teachings.

As provided herein, there is supplied teachings to systems and methods that combine single-cell non-orthogonal cluster screens in different color separations for moiré-free color halftoning.

Disclosed in embodiments herein is a method for generating a plurality of non-orthogonal halftone screens for moiré free color halftoning. The method defining a first color halftone screen having a first fundamental frequency vector $V_{c1}$ and second fundamental frequency vector $V_{c2}$. The method also defining a second color halftone screen having a first fundamental frequency vector $V_{m1}$ and second fundamental frequency vector $V_{m2}$ and, adjusting the values of the fundamental frequency vectors to identify combinations that satisfy the following:

$$V_{c2} + V_{m1} = -\frac{1}{2}V_{c1},$$

$$V_{c1} - V_{m2} = -\frac{1}{2}V_{m1}.$$

Also disclosed in embodiments herein is method for generating a plurality of non-orthogonal halftone screens for moiré free color halftoning. The method defining a first color halftone screen having a first fundamental frequency vector $V_{c1}$ and second fundamental frequency vector $V_{c2}$. The method also defining a second color halftone screen having a first fundamental frequency vector $V_{m1}$ and second fundamental frequency vector $V_{m2}$ and, adjusting the values of the fundamental frequency vectors to identify combinations that satisfy where the sum of the first color halftone screen second fundamental frequency vector $V_{c2}$ and the second color halftone screen first fundamental frequency vector $V_{m1}$ equate to a function of the first color halftone screen first fundamental frequency vector $V_{c1}$ while also satisfying where the difference of the second color halftone screen second fundamental frequency vector $V_{m2}$ taken from the first color halftone screen first fundamental frequency vector $V_{c1}$ equates to a function of the second color halftone screen first fundamental frequency vector $V_{m1}$.

BRIEF DESCRIPTION OF THE DRAWINGS

The patent or application file contains at least one drawing executed in color. Copies of this patent or patent application publication with color drawings will be provided by the Patent Office upon request and payment of the necessary fee.

DETAILED DESCRIPTION

The teachings disclosed herein provide a color halftone configuration that produces consistent rosettes free of moiré. With the non-orthogonal halftone screen technology thus developed it is possible to design three cluster halftone screens to generate halftone outputs with rosettes appearing as ordered hexagons of identical shape. The hexagon rosettes have three fundamental spatial frequencies exactly equal to half of fundamental frequencies of the three halftone screens. As a result, the halftone outputs are truly moiré-free, because there is no frequency component, fundamental or high-order harmonic, in single color or color combination, that is lower in frequency than the fundamental frequency of the hexagon rosettes. The requirements for achieving these exemplary hexagon rosettes is specified by two frequency-vector equations, in combination with conventional requirements for multi-color moiré-free halftoning.

Figure 1:
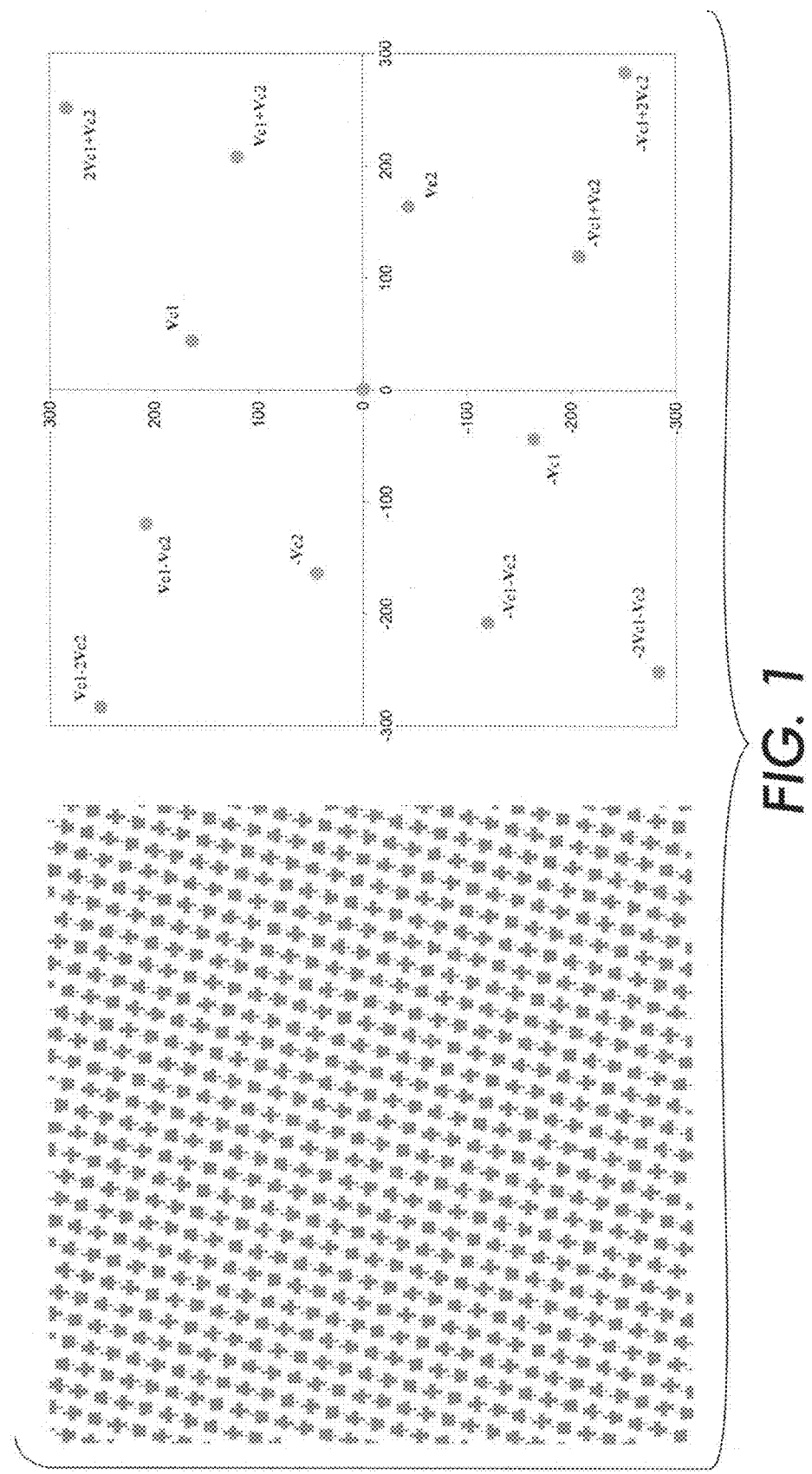
FIG. 1 depicts a halftone pattern created by a color system as its cyan screen, and along-side it the frequency representation for that cyan screen halftone pattern.
Figure 2:
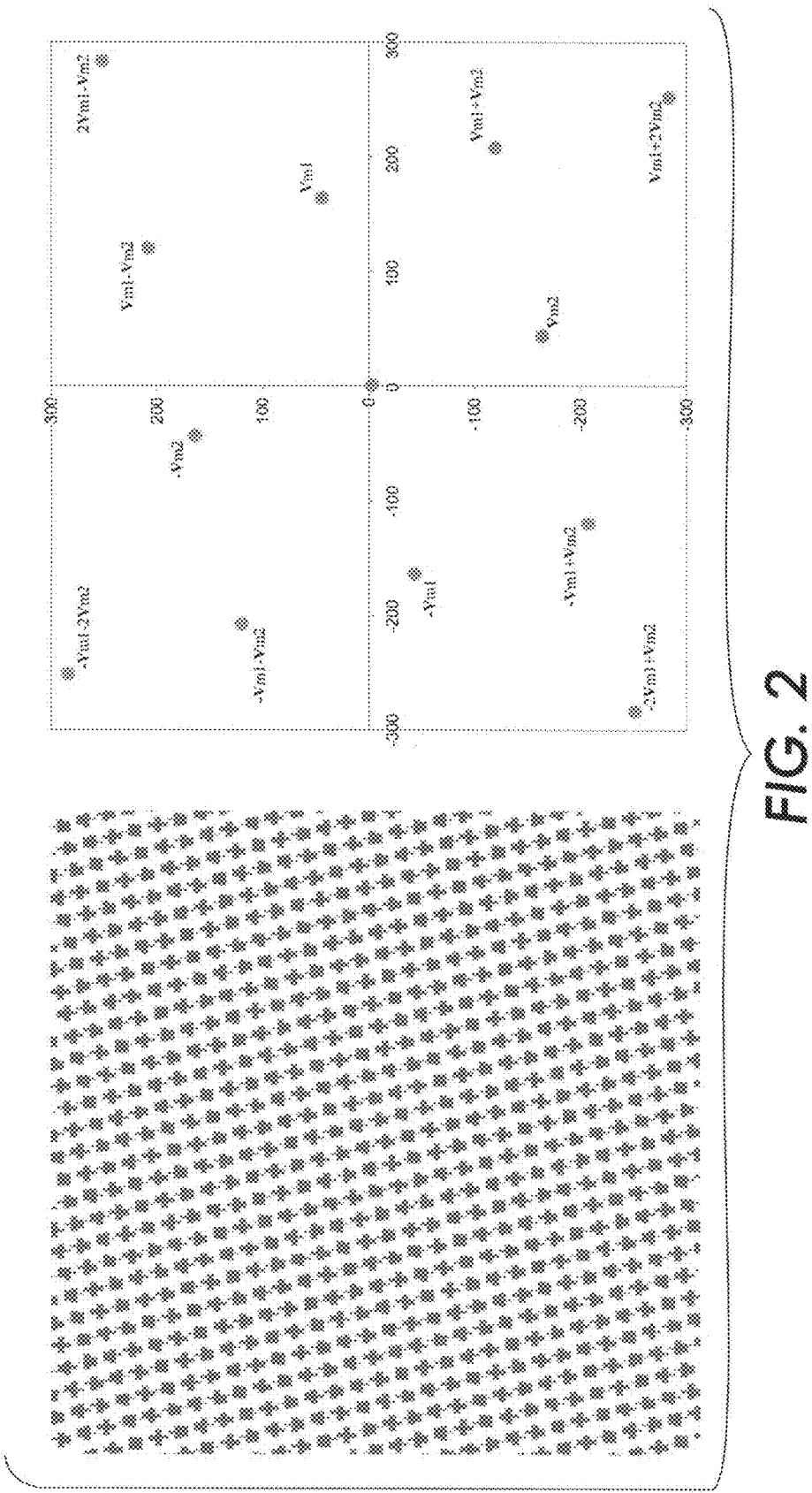
FIG. 2 depicts a halftone pattern created by a color system as its magenta screen, and along-side it the frequency representation for that magenta screen halftone pattern.
Figure 3:
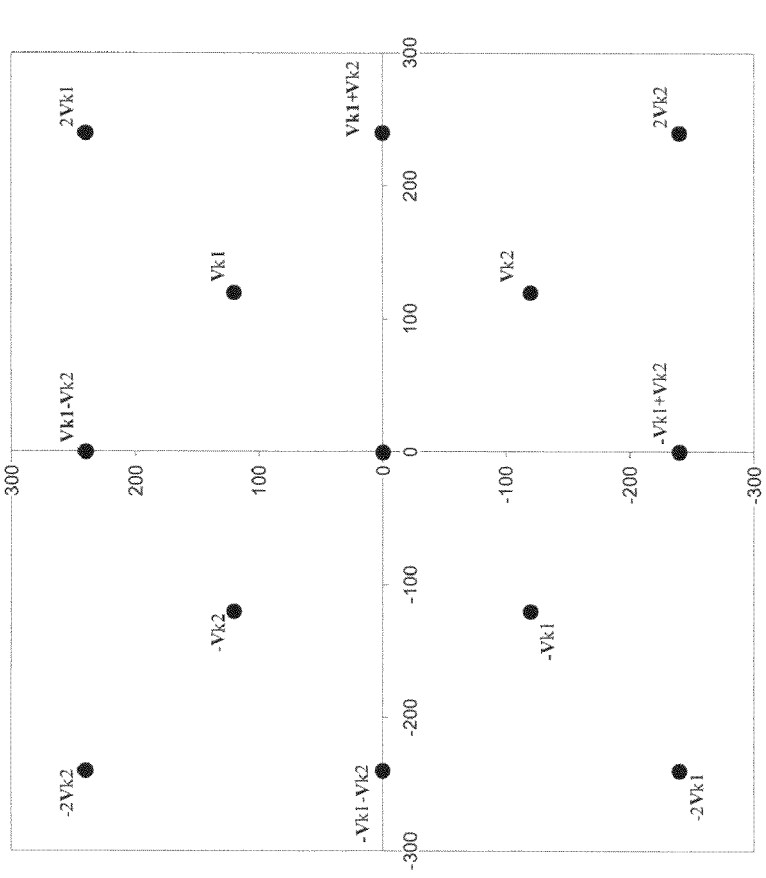
FIG. 3 depicts a halftone pattern created by a color system as its black screen, and along-side it the frequency representation for that black screen halftone pattern.
Figure 3:
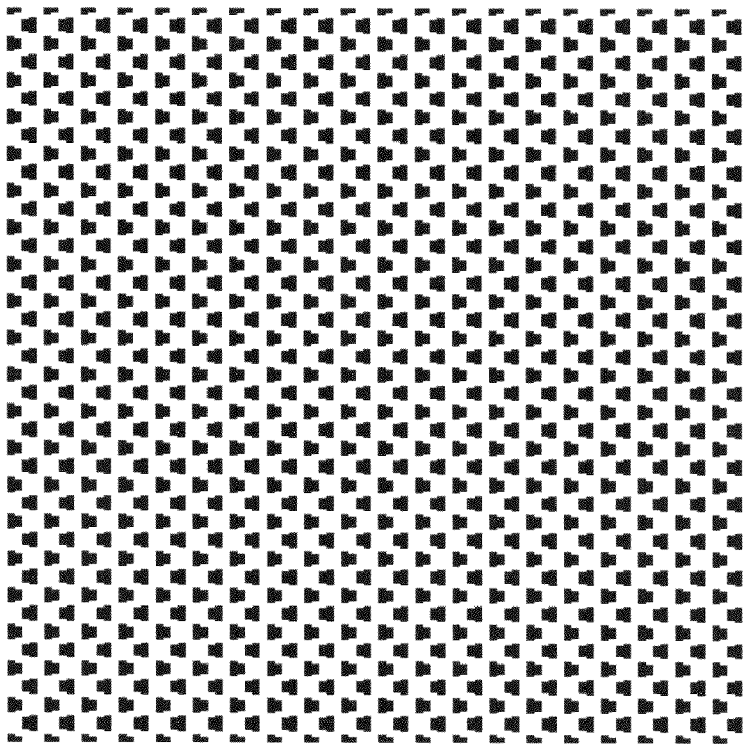

Most screening-based halftone methods use halftone screens in a two-dimensional tiling manner. Thus the corresponding halftone outputs posses strong periodic structures defined by the halftone screens. For example, in FIGS. 1-3 are three halftone patterns that demonstrate the outputs from a current exemplary color printer. The cyan pattern is the output of a 75° and −15° screen; the magenta pattern is the output of a, 15° and −75° screen; and the black is the output of a, 45° and −45° screen. All three patterns in FIGS. 1-3 show the halftone outputs as two-dimensional periodic structures (or quasi-periodical because of the super-cell approach) as the result of tiling square-shape screen cells.

Images can be also described by their Fourier transforms, or their spatial frequency representations. As the result of tiling halftone screens, Fourier transforms of above halftone patterns in FIGS. 1-3 are dominated by discrete frequency components defined by the two fundamental halftone frequencies for each screen and their two-dimensional higher-order harmonics, or linear combinations of the fundamentals. For the following discussion in this specification, we use the notation illustrated by the transform plots in FIGS. 1-3 to represent the Fourier transform of halftone patterns. Only the locations of the fundamental halftone frequency vectors, Vc1, Vc2, Vm1, Vm2, Vk1, and Vk2, and some of their harmonics are shown in the spatial frequency coordinates as circular dots, and the amplitude and phase of each component are ignored in these illustrations. The three plots in FIGS. 1-3 are the frequency representations of the three halftone patterns in the figures, respectively. Of course, there are many higher order harmonics for the halftone frequencies not shown in the plots which are necessarily limited by range of up to 300 line-per-inch in both directions.

Figure 4:
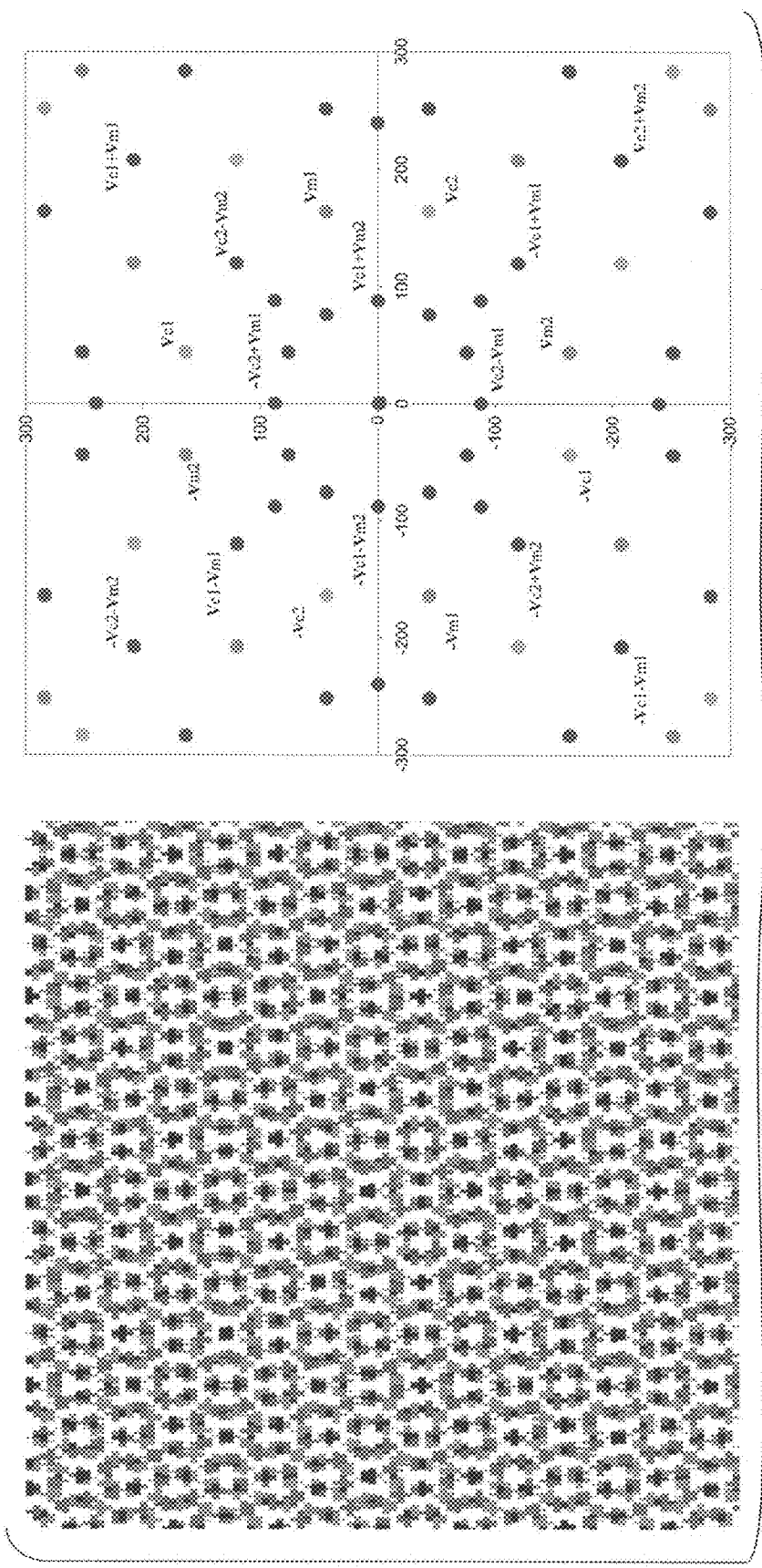
FIG. 4 depicts the superimposition of the cyan and magenta halftones as depicted in FIGS. 1 and 2 respectively, and along-side it the Fourier representation for that superimposition.

In color printing, due to the superposition of halftone screens for different process colors, more frequency components are typically created. Using Fourier analysis, we can express the result caused by such superposition of two different colors as their frequency-vector difference, Vcm=Vc±Vm, where Vc and Vm are two frequency components from two different colors, e.g., cyan and magenta, and Vcm is the difference vector. Since each Fourier component has its conjugate, i.e., there is always a frequency vector −Vc that represents the conjugate component of Vc, the sign definition of frequency vectors is rather arbitrary. For each halftone screen, there are two fundamental frequency vectors, thus the color mixing of two screens for two different colors yields eight difference vectors for the fundamental frequencies alone. Considering the other harmonics of the halftone frequencies, the combinations can yield a large number of difference vectors. In FIG. 4, the superposition of the cyan and magenta halftone patterns depicted in FIGS. 1 and 2 is shown on the left, and its frequency representation is on the right. Obviously, the frequency spectrum of the mixed colors is quite complicated and this explains why the halftone pattern of the superposition in FIG. 4 cannot be described as tiling a simple cell as it does in the simple monochromatic cases.

Figure 5:
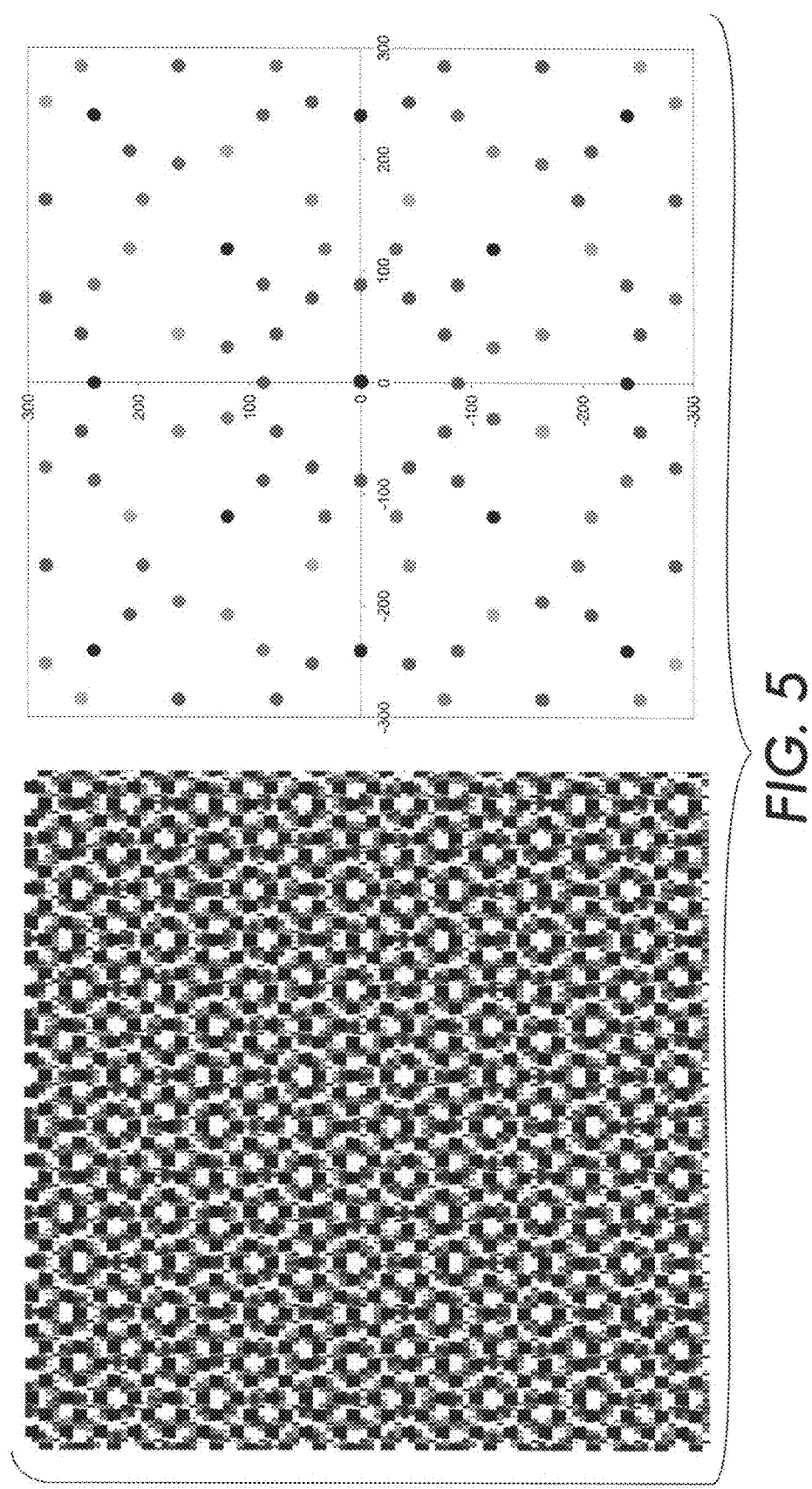
FIG. 5 depicts the superimposition of the cyan, magenta, and black halftones as depicted in FIGS. 1, 2, and 3, respectively, and along-side it the Fourier representation for that superimposition.

When the superposition involves three colors, typically, cyan, magenta and black, the situation becomes even more complex. As shown in FIG. 5, the halftone pattern, often referred as the rosette pattern, is not a simple repeated pattern at all and its Fourier representation is even more complicated than that for the two-color case. In traditional press printing, a same halftone screen is rotated to exactly 15°, 75° and 45° for cyan, magenta and black, respectively. It has been proven that the rosette pattern resulting from such a halftone configuration is theoretically non-periodic. (J. A. C. Yule, "Principles of Color Reproduction") In other words, the rosette pattern never repeats on the same page.

The common strategy to avoid any two-color moiré is to ensure that no two-color difference vector due to fundamental halftone frequencies is too small. The two-color moiré-free condition can be summarized by:

$$|V_c \pm V_m| > V_{min}, \quad (1)$$

where $V_c$=Vc1, −Vc1, Vc2, −Vc2; $V_m$=Vm1, −Vm1, Vm2, −Vm2; and $V_{min}$ is a frequency limit set at somewhere between 50-70 lines-per-inch for just noticeable moiré.

It is well known that the most troublesome moiré is the three-color moiré, that can appear in cyan-magenta-black prints produced by CMYK four-color printers. As an extension of the two-color case, the three-color moiré-free condition can be summarized by:

$$|V_c \pm V_m \pm V_k| > V_{min}, \quad (2)$$

where $V_c$=Vc1, −Vc1, Vc2, −Vc2; $V_m$=Vm1, −Vm1, Vm2, −Vm2; $V_k$=Vk1, −Vk1, Vk2, −Vk2; and $V_{min}$ is set similar to the two-color case. Since there are altogether thirty-two different combinations of different color components, it stands as a matter of practicality that to make all three-color difference vectors as well as all two-color difference vectors large enough to avoid any color moiré is very difficult, unless the halftone screens have very high frequencies fundamentals, say higher than 200 line-per-inch. An alternate, also common, approach is to make two of the three-color difference vectors null while keeping the rest large. Given that both the signs and the indices of frequency vectors are defined somewhat arbitrarily, without losing the generality, the three-color moiré-free condition can be specified by the following two vector equations:

$$V_{c1} + V_{m1} - V_{k1} = 0, \quad (3a)$$

$$V_{c2} + V_{m2} - V_{k2} = 0, \quad (3b)$$

The equations (3a) and (3b), are two of all possible frequency combinations of the three colors. In most practical applications, the rest of the combinations satisfy the inequality of equation (2) and are not specially specified.

Most conventional halftone screens use square-shape halftone cells for tiling. Therefore, the two fundamental frequency vectors of each screen are not independent to each other. Once one of the two equations, either (3a) or (3b) is satisfied, the other one is automatically held too. Recently, we have taught halftone methods (Wang et al. incorporated above) using non-orthogonal halftone screens, or general parallelogram-shape halftone screens, for moiré-free color halftone, in which case the two fundamental frequencies of each parallelogram-shape screen are independent to each other and thus satisfying both equations (3a) and (3b) is required for the three-color moiré-free condition.

It is also worth pointing out that the three-color moiré-free condition described herein is specified for the fundamental frequencies only. However, while it is understood that as a practical matter fundamentals are always more important than higher-order harmonics, there is never-the-less no guarantee that the moirés caused by combining the high-order harmonics from different colors would not be observable. It is of course very desirable to have all moirés eliminated, regardless of whether they are caused by the combining of fundamentals, or of high-order harmonics.

The teaching provided herein utilizes three non-orthogonal cluster screens in an exemplary configuration to achieve halftone outputs with uniform rosettes that appear as tiled hexagons all of identical shape. Certain conditions must be satisfied for such outputs and they can be specified either in the spatial domain, where shapes of halftone cells for different colors are defined by spatial vectors, or in the frequency domain, where halftone screens are specified by frequency vectors. In the disclosure that follows these certain conditions to be satisfied will be specified in the frequency domain by use of frequency vectors.

As discussed above, it has been shown that the frequency spectrum resulting from the superposition of cyan and magenta as shown in FIG. 4 is much more complicated than for a single color spectra, as depicted in FIGS. 1 and 2. Achieving a simpler spectrum in the frequency domain usually also means achieving a simpler halftone pattern in the spatial domain. It has been found that if the two screens, which can be specified by their fundamental frequency vectors, Vc1 and Vc2 (for cyan), Vm1 and Vm2 (for magenta) respectively, have the relation specified by the following vector equations, the outcome can be made much simpler:

$$V_{c2} + V_{m1} = -\frac{1}{2} V_{c1}, \quad (4a)$$

$$V_{c1} - V_{m2} = -\frac{1}{2} V_{m1}. \quad (4b)$$

As described previously above, the sign definition of these frequency vectors is somewhat arbitrary. However, to be consistent with the previously defined moiré-free condition provided in equations (3a) and (3b), this new requirement as specified in equations (4a) and (4b) is provided with proper signs assigned for all vectors.

Figure 6:
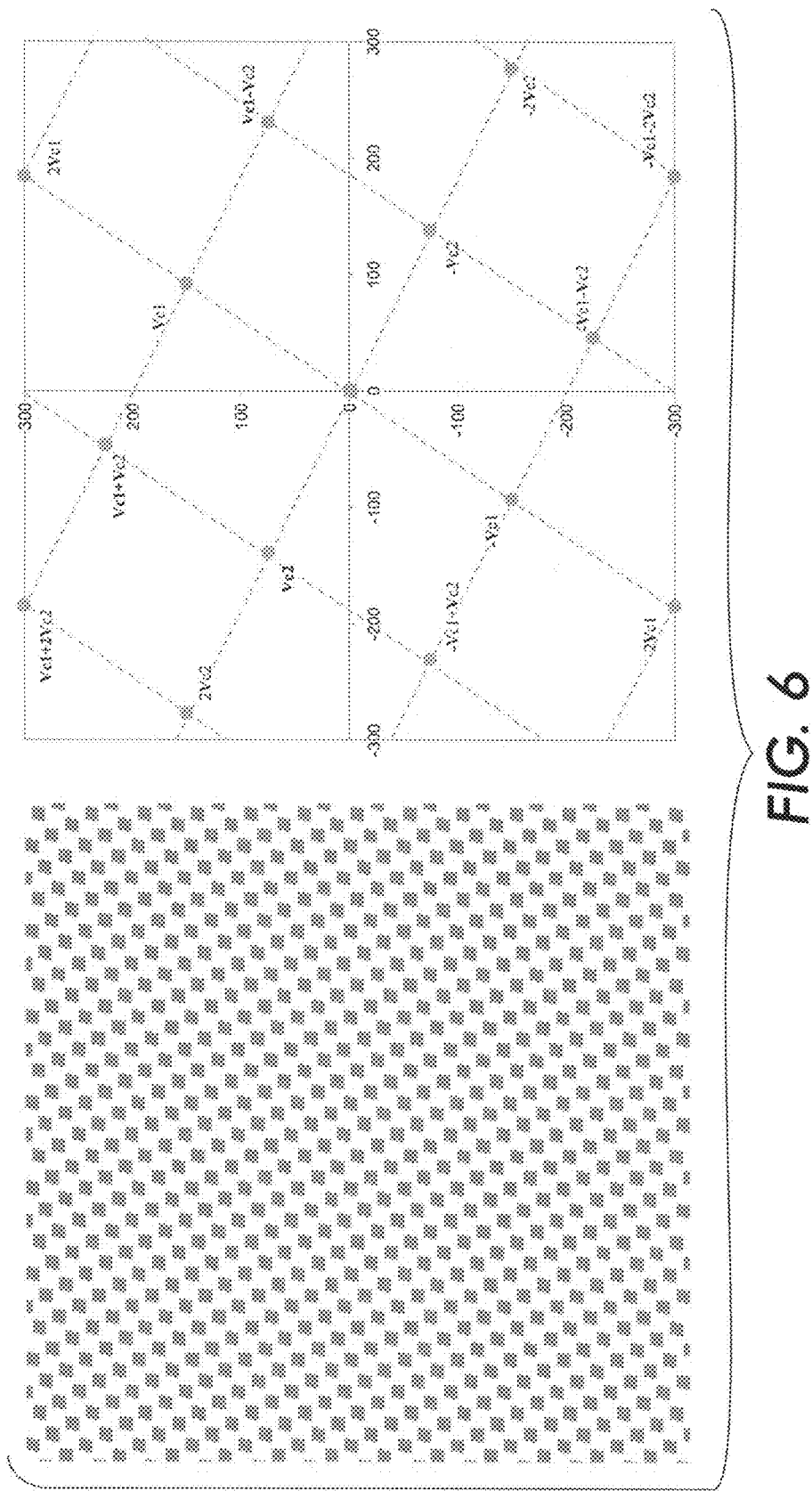
FIG. 6 depicts an exemplary cyan halftone pattern and its Fourier representation.
Figure 7:
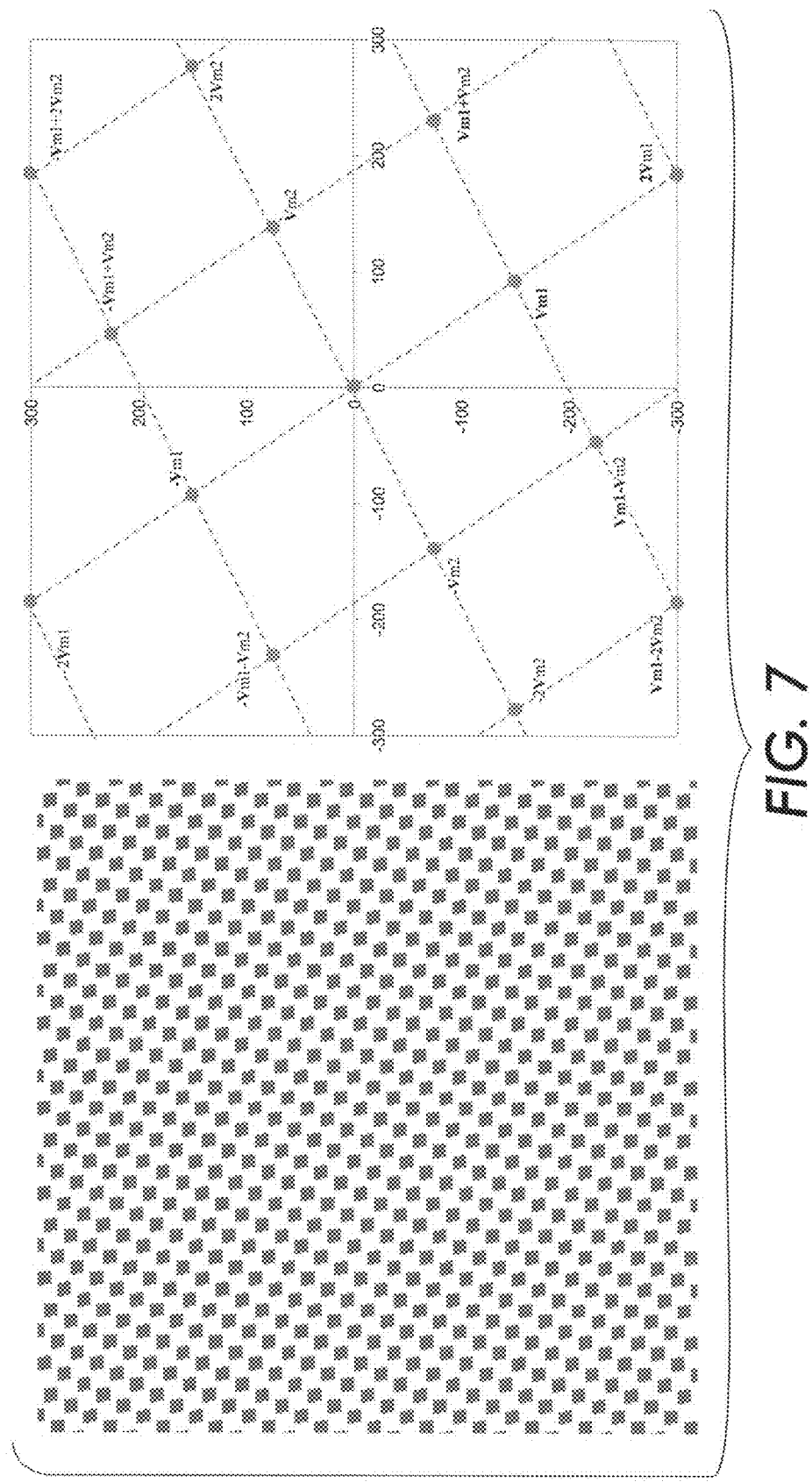
FIG. 7 depicts an exemplary magenta halftone pattern and its Fourier representation.

FIGS. 6 and 7 show the halftone outputs as provided by two halftone screens designed to satisfy the above requirement of equations (4a) & (4b) for cyan and magenta, respectively. The Fourier representations accompany the two halftone screens illustrated in FIGS. 6 and 7 as well. As is expected by the Fourier analysis, all frequency components for each color are well aligned as the linear combination of two fundamentals. For the purpose of illustration in FIGS. 6, 7, and others that follow, we use a grid drawn in dashed lines to indicate the alignment in each Fourier plot. One may note that the directions and spacing of these dashed lines are directly specified by the two fundamental halftone frequencies of the screen. Usually the two grids, cyan and magenta, do not share any common cross points except at the origin, or the dc term of the Fourier transform, as depicted in the examples, shown in the previous figures. However, the two screens illustrated by FIGS. 6 and 7 have satisfied the linear relations specified by equations (4a) and (4b), and therefore they share the same locations for their high-order components in the frequency representation. For example as shown by FIGS. 6 & 7, the cyan frequency component 2Vc1 (see FIG. 6) and the magenta component −Vm1+2Vm2 (see FIG. 7) are located at exactly the same place, similarly the location for the Vc1+ 2Vc2 component and the 2Vm1 component are respectively the same.

Figure 8:
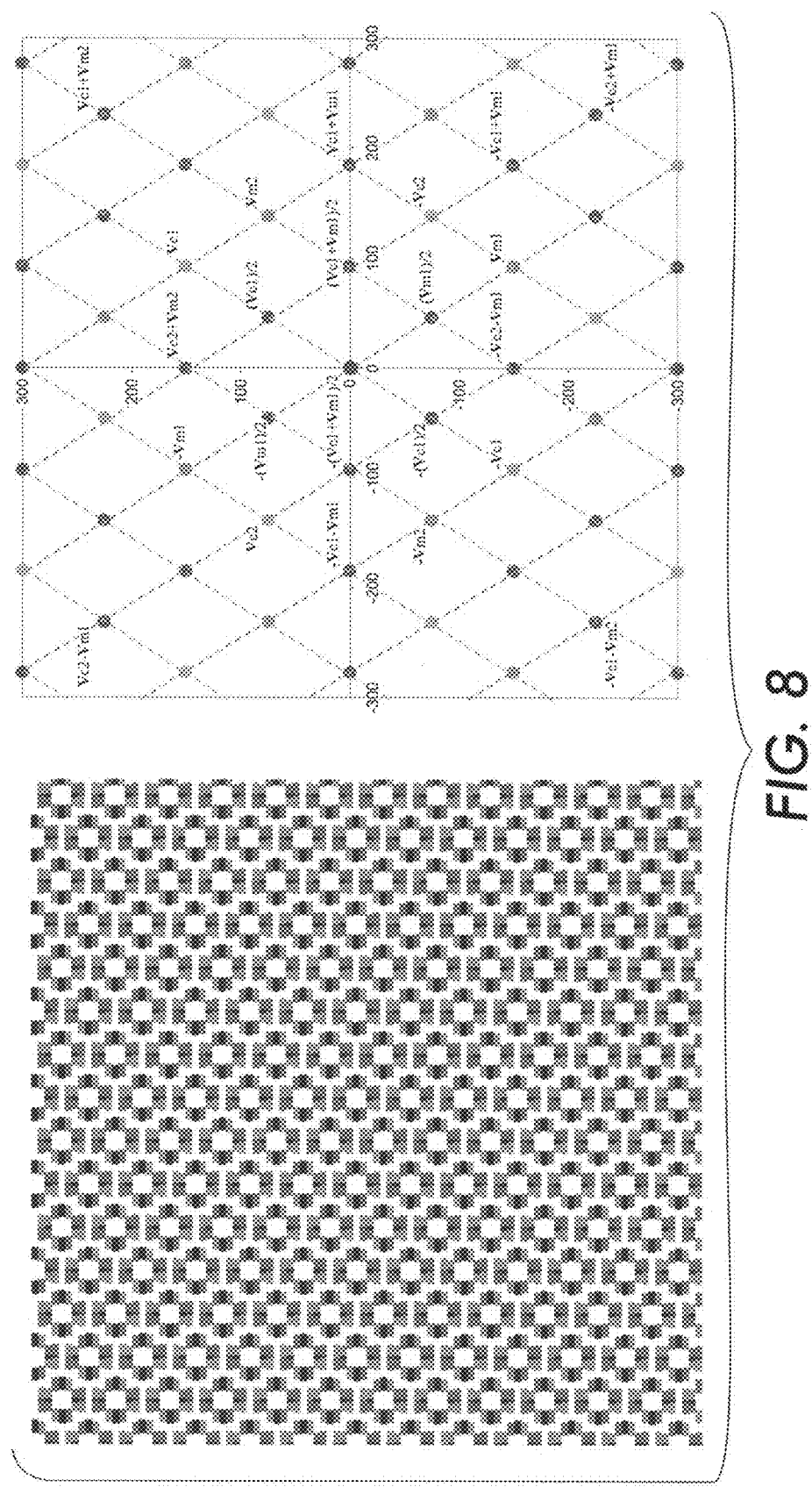
FIG. 8 depicts the superimposition of the exemplary cyan and magenta halftone patterns of FIGS. 6 and 7 respectively, and along-side it the corresponding Fourier representation for that superimposition.

It is more interesting to see the result of superposition of the two halftone patterns shown in FIGS. 6 and 7. FIG. 8 shows the blue halftone pattern (along-side the corresponding frequency representation) as created by the superimposition of the two screens from FIGS. 6 & 7 that satisfy the two vector equations (4a) and (4b). Besides all cyan and magenta circular dots shown in the Fourier representation plots of FIGS. 6 and 7, in the composite Fourier representation plot of FIG. 8 there are also some blue dots indicating the result of color mixing. It is clearly seen that all the dots, cyan, magenta and blue, are well aligned with a grid drawn in cyan dashed lines at about 60° and magenta dashed lines at about −60°. It is easy to prove from equations (4a) and (4b) that this grid is defined by the following two frequency vectors:

$$\frac{V_{c1}}{2} \text{ and } \frac{V_{m1}}{2}. \tag{5a}$$

The frequency spectrum, shown in FIG. 8, of the superposition of cyan and magenta resembles the Fourier transform of a non-orthogonal halftone screen with two fundamentals specified by frequency vectors in equation (5a). In fact, the halftone pattern shown in FIG. 8 appears exactly as the result of tiling with a parallelogram cell specified by the two frequency vectors in equation (5a). Because the angle between the two vectors Vc1 and Vm1 is about 120°, this parallelogram can be also seen as a hexagon with a third frequency vector given by:

$$\frac{V_{c1} + V_{m1}}{2}. \tag{5b}$$

Returning to the Fourier representation in FIG. 8, the third frequency vector as denoted in equation (5b) can be found on the horizontal axis. One could easily prove that all dots in the plot could be also connected by some imaginary horizontal grid lines in blue dashed lines and get the hexagon picture from the Fourier representation as well.

Similar requirements can be applied to other two color combinations in a CMYK system, cyan and black, or magenta and black, i.e.:

$$V_{c2} + V_{k1} = \frac{1}{2}V_{c1}, \tag{6a}$$

$$V_{c1} - V_{k2} = \frac{1}{2}V_{k1}. \tag{6b}$$

or $$V_{m1} + V_{k2} = \frac{1}{2}V_{k1}, \tag{7a}$$

$$V_{m2} - V_{k1} = -\frac{1}{2}V_{m1}. \tag{7b}$$

Figure 9:
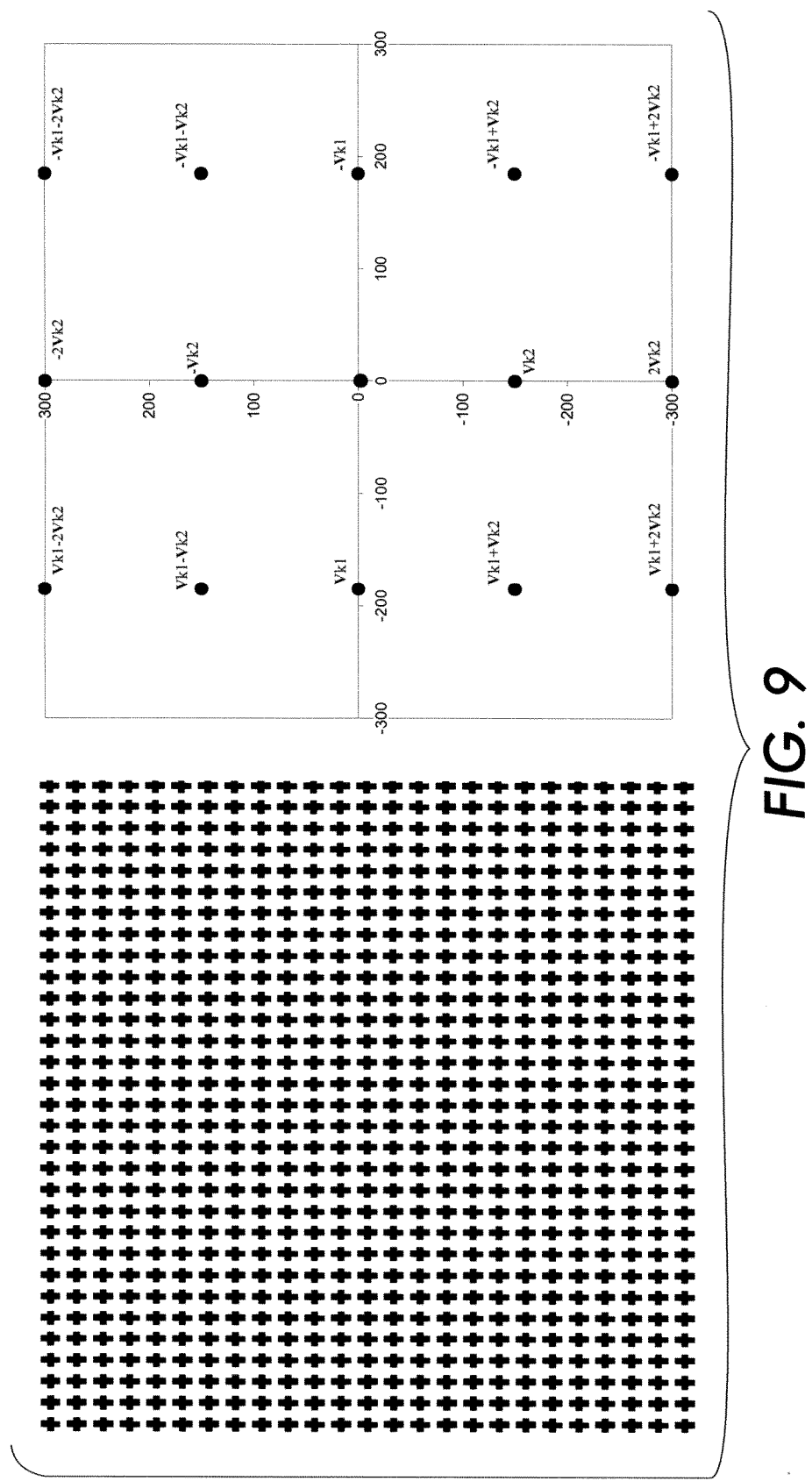
FIG. 9 depicts an exemplary black halftone pattern and its Fourier representation.
Figure 10:
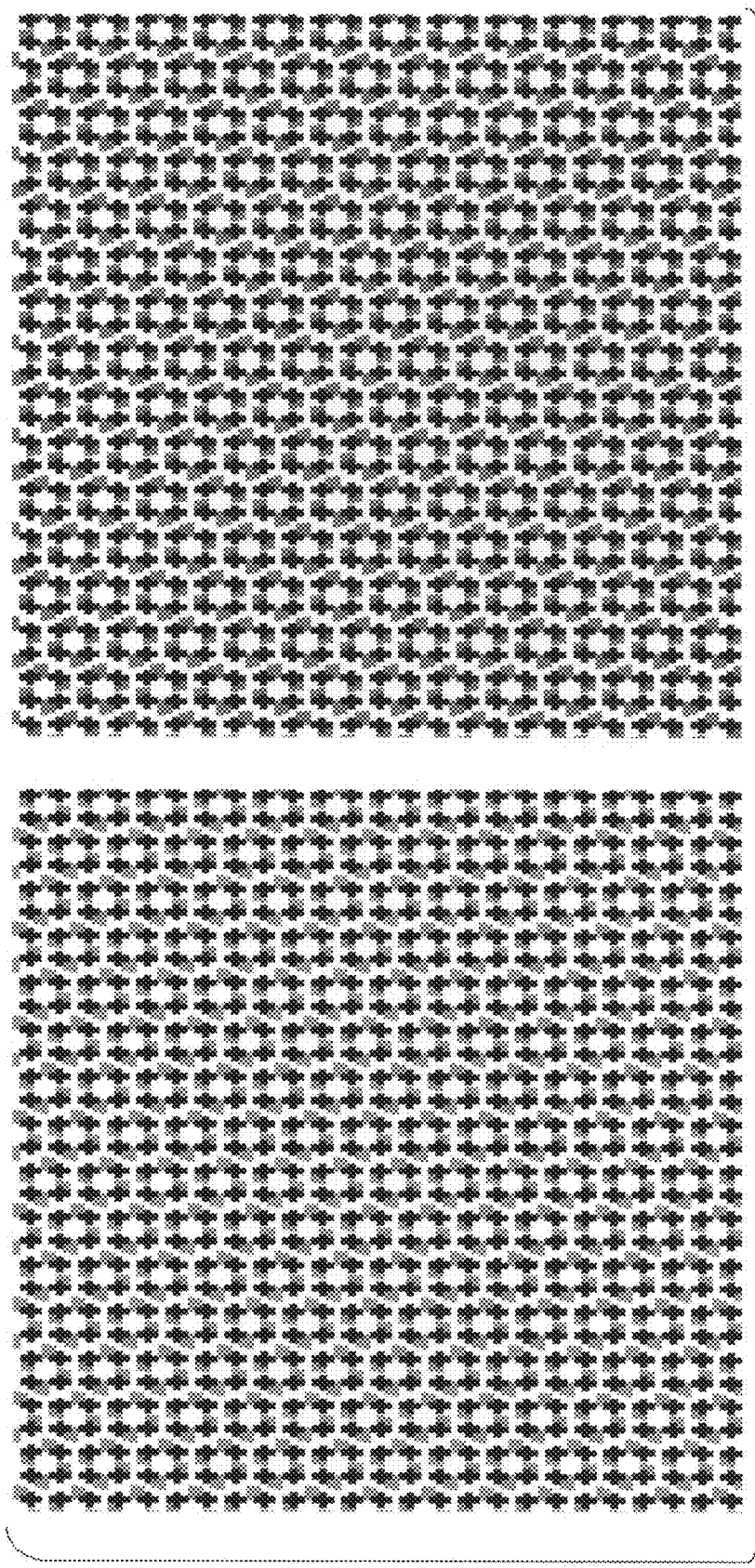
FIG. 10 depicts the superimposition of the exemplary black halftone pattern of FIG. 9 with the exemplary cyan halftone pattern (on the left) and with the exemplary magenta halftone pattern (on the right).
Figure 11:
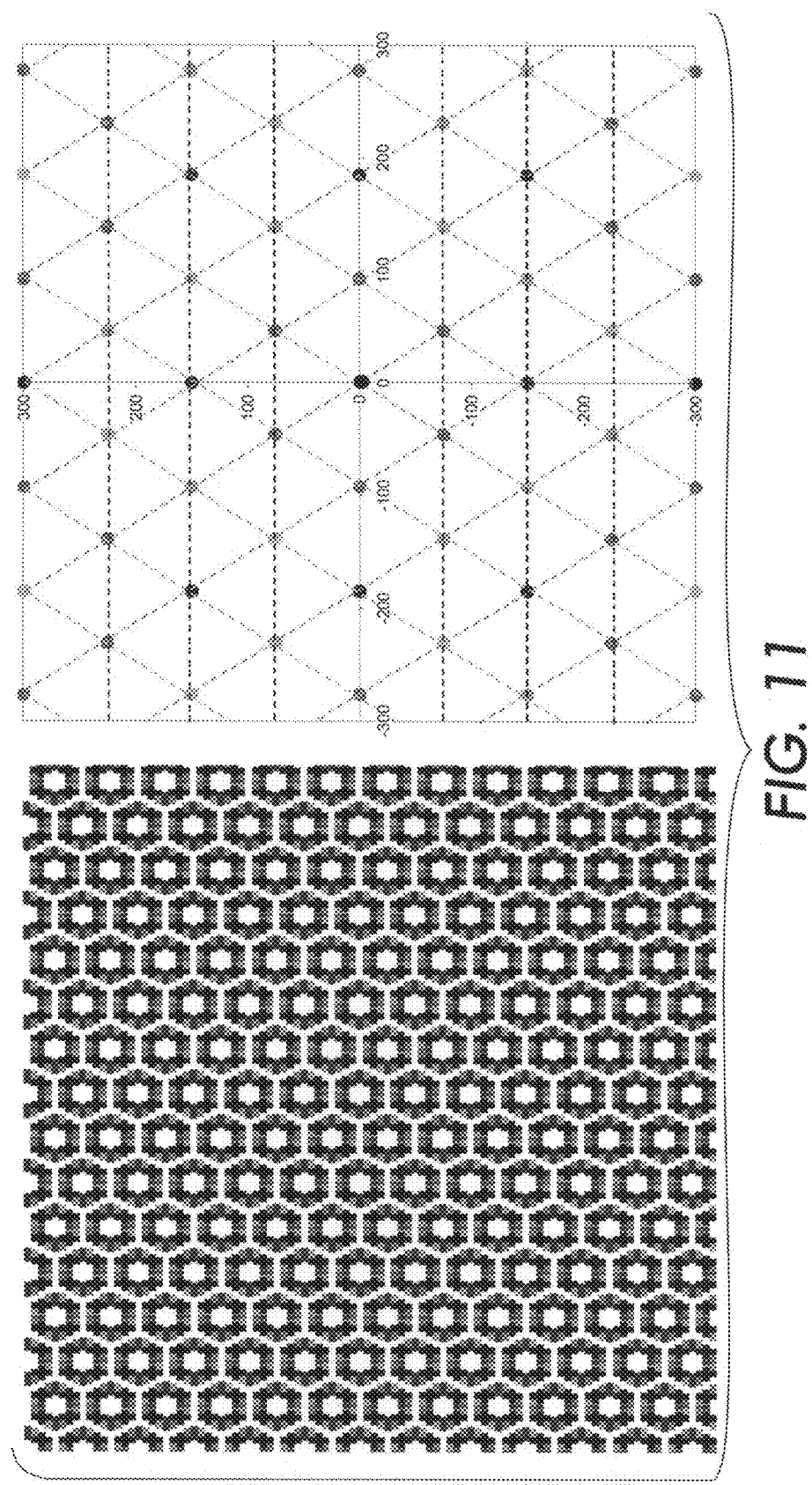
FIG. 11 depicts the superimposition of the exemplary cyan, magenta, and black halftone patterns of FIGS. 6, 7, and 9 respectively, with the corresponding Fourier representation for that exemplary rosette along-side.

Using the cyan and magenta screens described above and either equations (6a) and (6b), or (7a) and (7b), we can find the frequency configuration for the black screen. The solution is shown in FIG. 9. The superposition of cyan and black with a satisfaction of equations (6a) and (6b) is shown in FIG. 10; and the superposition of magenta and black, is shown in FIG. 11. The three frequency vectors specifying the hexagon shape in the cyan and black case are given by:

$$\frac{V_{c1}}{2}, \frac{V_{k1} + V_{c1}}{2} \text{ and } \frac{V_{k1}}{2}. \tag{8}$$

The three vectors for the magenta and black case are:

$$\frac{V_{m1} + V_{k1}}{2}, \frac{V_{m1}}{2} \text{ and } \frac{V_{k1}}{2}, \tag{9}$$

Now consider the presence of all three colors. Although the requirements for the two color hexagon tiling condition are specified for different color combinations by equations (4), (6) and (7), respectively. These equations are not completely independent to each other. It is a straightforward proof that if both the three-color moiré-free condition, specified by equations (3a) and (3b), and the hexagon tiling condition for cyan and magenta, equations (4a) and (4b) are satisfied, equations (6a) and (6b), for cyan and black, (7a) and (7b), for magenta and black, are also true. Moreover, with the equation (3a), one can see the three frequency vectors set by equations (5a) and (5b) to specify the hexagon shape in the cyan and magenta case, are identical to the ones set by equation (8) in the cyan and black case, as well as ones set by equation (9) in the magenta and black case. In other words, the hexagon cell shape is identical for all color combinations and can be described as:

$$\frac{V_{c1}}{2}, \frac{V_{m1}}{2} \text{ and } \frac{V_{k1}}{2}. \tag{10}$$

When three color halftone patterns are superposed, the centers of the hexagons from the different two-color superimpositions should be aligned for different design goals. It is a well-known practice in the halftone screen design arts to align three halftone screens for either dot-centered rosettes or hole-centered rosettes and we skip the discussion here as well understood by those skilled in the art. With aligned rosette centers the halftone pattern in three colors using the three screens satisfying both the moiré-free conditions and hexagon rosette condition is shown in FIG. 11. One should realize that at almost any cross point of the grid there is superposition of multiple components from different color combinations. The grid shown in cyan and magenta dash lines is identical to the one in FIG. 8 for the two-color case and black dash lines are also added to indicate the third vector specified by (Vk1)/2.

Comparing the hexagon rosette pattern in FIG. 11 with the conventional one in FIG. 6, the new one is much simpler and much more uniform, which results in a more pleasing texture. Besides the pleasant appearance, the most interesting observation is that all frequency components, including all fundamentals and their harmonics of monochromatic halftones and all possible color combinations, are located on the grid in the Fourier representation of the halftone. As long as the three frequency vectors, specified by equation (10), are large enough, this is a true moiré-free halftone, because no frequency component would be smaller than the three vectors.

It is also interesting to notice that such hexagon rosette patterns can be only realized by using non-orthogonal or parallelogram cluster screens. The combination of the moiré-free condition and the hexagon-tiling condition requires four vector equations. Three square-shape halftone screens only provide three independent frequency vectors, therefore, no solution can be found for hexagon rosettes. Even if rectangular cells are used, there is no rational solution for digital halftoning. On the other hand, three non-orthogonal parallelogram screens provide up to six independent frequency vectors, which are more than enough to get practical solutions for hexagon rosettes.

One particular set of cyan, magenta and black halftone screens has been designed. The exemplary design satisfies both the moiré-free condition, of equations (3a) and (3b), and the hexagon rosette condition, of equations (4a) and (4b). All the examples described above are members of this exemplary set. The frequency specifications of these screens are listed below. All frequency components are measured in units of line-per-inch, and frequency angles are defined with respect to the vertical y-axis.

| Cyan screen: | Vc1 = (92.3, 150); | \|Vc1\| = 176.1, at −31.6°; |
|---|---|---|
| | Vc2 = (−138.5, 75); | \|Vc2\| = 157.5, at 61.5°; |
| Magenta screen: | Vm1 = (92.3, −150); | \|Vm1\| = 176.1, at 31.6°; |
| | Vm2 = (138.5, 75); | \|Vm2\| = 157.5, at −61.5°; |
| Black screen: | Vk1 = (184.6, 0); | \|Vk1\| = 184.6, at 90°; |
| | Vk2 = (0, 150.0); | \|Vk2\| = 150.0, at 0°. |

All three screens are single-cell, or congruent, screens and the shape of these cells can be described by the following spatial vectors with a 4800×600 resolution:

| Cyan: | vc1 = (26, 2); |
|---|---|
| | vc2 = (−13, 3); |
| Magenta: | vm1 = (−26, 2); |
| | vm2 = (13, 3); |
| Black: | vk1 = (26, 0); |
| | vk2 = (0, 4). |

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for halftoning image data in a color system, the method comprising:
    receiving image data;
    defining a first color halftone screen having a first fundamental frequency vector $V_{c1}$ and second fundamental frequency vector $V_{c2}$;
    defining a second color halftone screen having a first fundamental frequency vector $V_{m1}$ and second fundamental frequency vector $V_{m2}$;
    selecting the values of the fundamental frequency vectors to identify combinations that satisfy the following:

$$V_{c2} + V_{m1} = -\frac{1}{2}V_{c1}, \text{ and}$$

$$V_{c1} - V_{m2} = -\frac{1}{2}V_{m1};$$

a printing apparatus applying the defined first color halftone screen and the defined second color halftone screen to the received image data; and
    printing the result.

2. The method of claim 1 further comprising:
    defining a third color halftone screen having a first fundamental frequency vector $V_{k1}$ and second fundamental frequency vector $V_{k2}$; and
    selecting the values of the fundamental frequency vectors to identify combinations that further satisfy the following:

$$V_{c2} + V_{k1} = \frac{1}{2}V_{c1}, \text{ and}$$

$$V_{c1} - V_{k2} = \frac{1}{2}V_{k1}.$$

3. The method of claim 1 further comprising:
    defining a third color halftone screen having a first fundamental frequency vector $V_{k1}$ and second fundamental frequency vector $V_{k2}$; and
    selecting the values of the fundamental frequency vectors to identify combinations that further satisfy the following:

$$V_{m1} + V_{k2} = \frac{1}{2}V_{k1}, \text{ and}$$

$$V_{m2} - V_{k1} = -\frac{1}{2}V_{m1}.$$

4. The method of claim 2 further comprising:
    selecting the values of the fundamental frequency vectors to identify combinations that further satisfy the following:

$$V_{c1} + V_{m1} - V_{k1} = 0, \text{ and}$$

$$V_{c2} + V_{m2}V_{k2} = 0.$$

5. The method of claim 1 where the defined first color halftone screen having a first fundamental frequency vector $V_{c1}$ and second fundamental frequency vector $V_{c2}$, comprises the color cyan.

6. The method of claim 1 where the defined second color halftone screen having a first fundamental frequency vector $V_{m1}$ and second fundamental frequency vector $V_{m2}$, comprises the color magenta.

7. The method of claim 2 where the defined third color halftone screen having a first fundamental frequency vector $V_{k1}$ and second fundamental frequency vector $V_{k2}$, comprises the color black.

8. The method of claim 2 where a resultant halftone screen comprises hexagon rosettes of identical shape and two-dimension periodic.

9. A method for halftoning image data in a color system, the method comprising:

receiving image data;

defining a first color halftone screen having a first fundamental frequency vector $V_{c1}$ and second fundamental frequency vector $V_{c2}$;

defining a second color halftone screen having a first fundamental frequency vector $V_{m1}$ and second fundamental frequency vector $V_{m2}$, where the sum of the first color halftone screen second fundamental frequency vector $V_{c2}$ and the second color halftone screen first fundamental frequency vector $V_{m1}$ equate to a function of the first color halftone screen first fundamental frequency vector $V_{c1}$, and further where the difference of the second color halftone screen second fundamental frequency vector $V_{m2}$ taken from the first color halftone screen first fundamental frequency vector $V_{c1}$ equates to a function of the second color halftone screen first fundamental frequency vector $V_{m1}$;

a printing apparatus applying the defined first color halftone screen and the defined second color halftone screen to the received image data; and printing the result.

10. The method of claim 9 further comprising:

defining a third color halftone screen having a first fundamental frequency vector $V_{k1}$ and second fundamental frequency vector $V_{k2}$; and adjusting the values of the fundamental frequency vectors to identify combinations that further satisfy where the sum of the first color halftone screen first fundamental frequency vector $V_{c1}$, plus the second color halftone screen first fundamental frequency vector $V_{m1}$, minus the third color halftone screen first fundamental frequency vector $V_{k1}$ equates to zero, while also satisfying where the sum of the first color halftone screen second fundamental frequency vector $V_{c2}$, plus the second color halftone screen second fundamental frequency vector $V_{m2}$, minus the third color halftone screen second fundamental frequency vector $V_{k2}$ equates to zero.

11. The method of claim 9 where the defined first color halftone screen having a first fundamental frequency vector $V_{c1}$ and second fundamental frequency vector $V_{c2}$, comprises the color cyan.

12. The method of claim 9 where the defined second color halftone screen having a first fundamental frequency vector $V_{m1}$ and second fundamental frequency vector $V_{m2}$, comprises the color magenta.

13. The method of claim 10 where the defined third color halftone screen having a first fundamental frequency vector $V_{k1}$ and second fundamental frequency vector $V_{k2}$, comprises the color black.

14. The method of claim 8 where the resultant cluster screen comprises hexagon rosettes of identical shape and two-dimension periodic.

15. A method for halftoning image data in a color system, the method comprising:

receiving image data;

defining a first color halftone screen having a first fundamental frequency vector $V_{c1}$ and second fundamental frequency vector $V_{c2}$;

defining a second color halftone screen having a first fundamental frequency vector $V_{m1}$ and second fundamental frequency vector $V_{m2}$;

defining a third color halftone screen having a first fundamental frequency vector $V_{k1}$ and second fundamental frequency vector $V_{k2}$;

adjusting the values of the fundamental frequency vectors to identify combinations that satisfy the following:

$$V_{c1} + V_{m1} - V_{k1} = 0,$$
$$V_{c2} + V_{m2} - V_{k2} = 0,$$
$$V_{c2} + V_{m1} = -\frac{1}{2}V_{c1}, \text{ and}$$
$$V_{c1} - V_{m1} = -\frac{1}{2}V_{m1};$$

a printing apparatus applying the defined first color halftone screen, the defined second color halftone screen, and the defined third color halftone screen to the received image data; and printing the result.

16. The method of claim 15 where the defined first color halftone screen having a first fundamental frequency vector $V_{c1}$ and second fundamental frequency vector $V_{c2}$, comprises the color cyan, the defined second color halftone screen having a first fundamental frequency vector $V_{m1}$ and second fundamental frequency vector $V_{m2}$, comprises the color magenta, and the defined third color halftone screen having a first fundamental frequency vector $V_{k1}$ and second fundamental frequency vector $V_{k2}$, comprises the color black.

17. The method of claim 15 where the resultant cluster screen comprises hexagon rosettes of identical shape and two-dimension periodic.

18. A color printing apparatus providing a hexagon rosette for halftoning of image data in printed reproduction comprising:

a first color halftone screen including, a first fundamental frequency vector $V_{c1}$ and a value associated therewith, as well as, a second fundamental frequency vector $V_{c2}$ and a value associated therewith;

a second color halftone screen including, a first fundamental frequency vector $V_{m1}$ and a value associated therewith, as well as, a second fundamental frequency vector $V_{m2}$ and a value associated therewith;

the values assigned said first and second color halftone screen fundamental frequencies satisfying the following:

$$V_{c2} + V_{m1} = -\frac{1}{2}V_{c1}, \text{ and}$$
$$V_{c1} - V_{m2} = -\frac{1}{2}V_{m1};$$

a printing apparatus applying the first color halftone screen and the second color halftone screen to image data; and printing a final printout.

19. The apparatus claim of claim 18 where the first color halftone screen is cyan.

20. The apparatus claim of claim 18 where the second color halftone screen is magenta.

21. The apparatus claim of claim 18 where the first color halftone screen is yellow.

22. The apparatus claim of claim 19 where the second color halftone screen is yellow.

23. A color printing apparatus providing a hexagon rosette for halftoning of image data in printed reproduction comprising:
- a first color halftone screen including, a first fundamental frequency vector $V_{x1}$, as well as, a second fundamental frequency vector $V_{x2}$;
- a second color halftone screen including, a first fundamental frequency vector $V_{y1}$, as well as, a second fundamental frequency vector $V_{y2}$;
- a third color halftone screen including, a first fundamental frequency vector $V_{z1}$, as well as, a second fundamental frequency vector $V_{z2}$;
- said first, second and third color halftone screen fundamental frequencies satisfying the following:

$$V_{x1} + V_{y1} - V_{z1} = 0,$$
$$V_{x2} + V_{y2} - V_{z2} = 0,$$
$$V_{x2} + V_{y1} = -\frac{1}{2}V_{x1}, \text{ and}$$
$$V_{x1} - V_{y2} = -\frac{1}{2}V_{y1};$$

- a printing apparatus applying the first color halftone screen and the second color halftone screen to image data; and
- printing a final printout.

24. The apparatus claim of claim 23 where the first color halftone screen is cyan.

25. The apparatus claim of claim 23 where the second color halftone screen is magenta.

26. The apparatus claim of claim 23 where the third color halftone screen is black.

27. The apparatus claim of claim 23 where the second color halftone screen is yellow.

* * * * *